March 22, 1960
T. H. NEFF
2,929,400
INLINE VALVE CONSTRUCTION
Filed Feb. 18, 1958
2 Sheets-Sheet 1
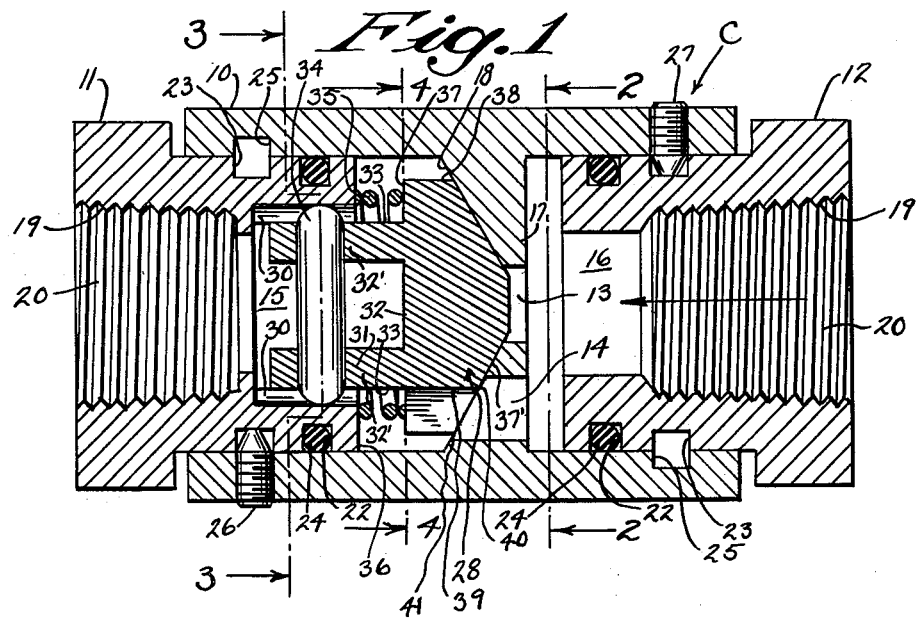
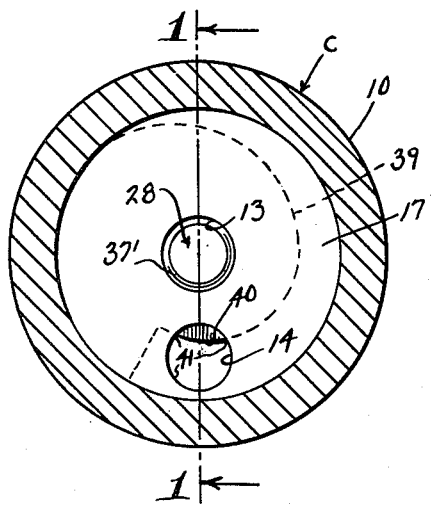
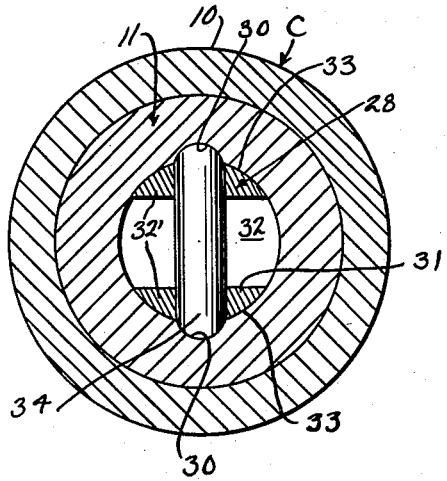
INVENTOR
THOMAS H. NEFF
BY
*Young and Wright*
ATTORNEYS March 22, 1960 T. H. NEFF 2,929,400
INLINE VALVE CONSTRUCTION
Filed Feb. 18, 1958 2 Sheets-Sheet 2
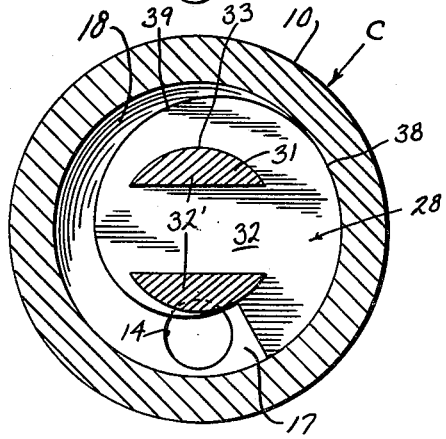
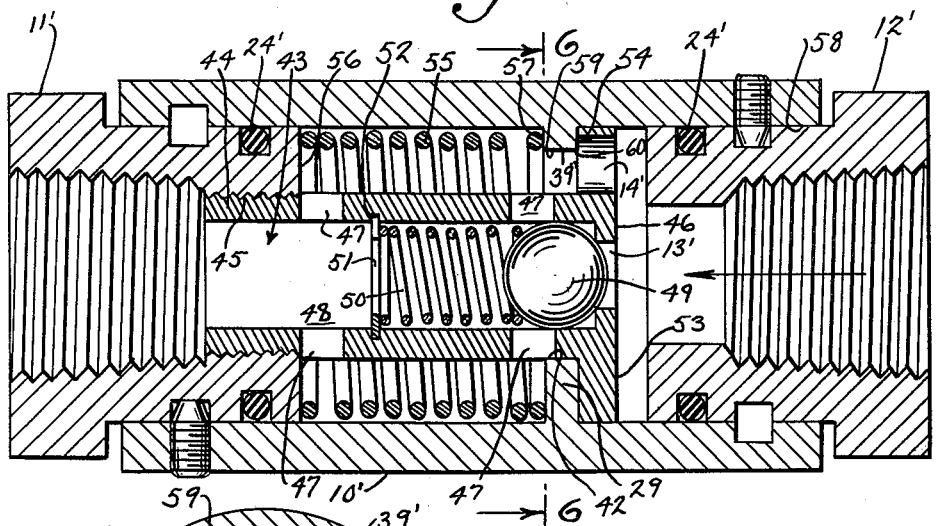
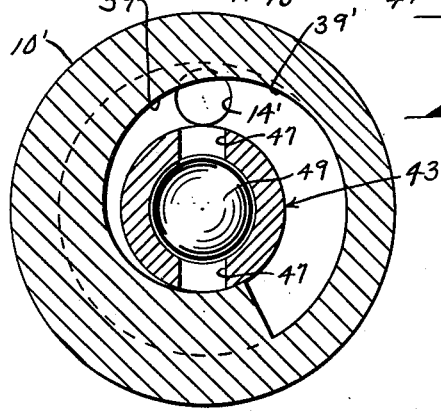
INVENTOR
THOMAS H. NEFF

United States Patent Office 2,929,400
Patented Mar. 22, 1960

2,929,400
INLINE VALVE CONSTRUCTION

Thomas H. Neff, Milwaukee, Wis., assignor to Neff Eng. Co., Fort Wayne, Ind., a corporation Application February 18, 1958, Serial No. 715,983

2 Claims. (Cl. 137—516.15)

This invention appertains to control valves and, more particularly, to an inline valve construction adapted for air or hydraulic use.

One of the primary objects of my present invention is to provide an inline control valve of a simple and durable construction, which will provide a free-flow of fluid therethrough in one direction but which can be easily and quickly adjusted or set to provide a fine control over the flow of fluid therethrough, in the opposite direction.

Heretofore, in providing valves of the type having a free-flow in one direction and a controlled flow in the opposite direction, a valve was provided having a poppet valve assembly which opens against the tension of a spring to provide the free-flow in one direction and a controlled flow in the opposite direction by means of a needle valve or the like. This is far from satisfactory even though the needle valve can give an adjusted control. Nevertheless, primarily due to the seat construction, this needle valve tends to clog up and is also difficult to give an extremely accurate regulation. Other types of adjustments have been provided but these also tend to clog in that no clean sharp edges are provided either on the valves or ports to cut and eliminate foreign matter.

Therefore, another primary object of my present invention is to provide an inline control valve wherein the flow of fluid in one direction can be controlled to an extremely fine degree with the edge of the controlling surface being clear, sharp and defined so that it will not clog and hence gives a very fine and accurate adjustment.

Another salient feature of my invention resides in providing a speed control valve having a valve seat upon which a spring pressed valve is seated to provide a free-flow in one direction and to provide an opening space therefrom, movable in relation to a cam control surface to give the fine adjustment control in the opposite direction.

A further important object of my preesnt invention is to provide a novel inline control valve construction having a central valve casing and a pair of longitudinally aligned end sections with means for locking the end sections to the central section and for mounting the control valve to the pipe line.

A more specific object of my present invention is to provide a control valve having two apertures or passageways therein, one offset from the other, a poppet valve utilized to control the free-flow of fluid in one direction and an arcuate graduated control surface adapted to be turned or rotated in relation to the other aperture or passageway to give a fine adjusted control of the fluid in the opposite direction.

A still further object of my present invention is to provide novel means associated with said central casing and end sections for holding the parts in an assembled selected control condition against fluid leakage.

With these and other objects in view, the invention consists in the novel construction, combination and arrangement of parts as will be hereinafter more specifically defined and claimed and illustrated in the accompanying drawings, in which drawings:

Figure 1 is a longitudinal sectional view through my valve illustrating the novel means for providing a free-flow in one direction and a controlled flow in the opposite direction, the section being represented by the line 1—1 of Figure 2 of the drawings and looking in the direction of the arrows;

Figure 2 is a transverse section particularly through the center casing of the valve showing the control flow port adjusted to an intermediate position for control of the fluid flow, the section being taken on the line 2—2 of Figure 1 and looking in the direction of the arrows;

Figure 3 is a transverse section through the opposite end of the valve showing details in construction of the respective end sections and poppet valve, the section being taken on the line 3—3 of Figure 1 and looking in the direction of the arrows;

Figure 4 is a transverse section taken on the line 4—4 of Figure 1 looking into the direction of the arrows and clearly showing the arcuate cam surface for regulating and adjusting the controlled flow through the port to any position to give an extremely fine adjustment;

Figure 5 is a longitudinal sectional view through a modified form of my invention in which the central casing is provided with the arcuate cam surface and opening instead of the poppet valve, and Figure 6 is a transverse section taken on the line 6—6 of Figure 5 looking in the direction of the arrows and illustrating further details in the valve construction.

Referring now to the drawings in detail wherein similar reference characters designate corresponding parts throughout the several views, the letter C generally indicates one form of my improved inline control valve and the same includes, broadly, an outer casing or a center section 10 and aligned end sections 11 and 12, respectively. The center section 10 is preferably barrel shaped and provided with an axial port 13 and an offset passageway or port 14. These ports communicate with enlarged chambers 15 and 16, respectively, which, in turn, open out to the respective ends of the casing 10 and end sections 11 and 12. The passageways or ports 13 and 14 are formed in an integral inner wall or partition 17 positioned in the casing 10 adjacent to and on one side of a point midway its longitudinal length and one end of said partition is dished or conically shaped at 18 for a purpose that will later appear.

The end sections 11 and and 12 are identically formed and each is provided with an axial longitudinal bore 19 extending entirely therethrough. The outer ends of the bore are internally threaded at 20 to form connection with the pipe or line (not shown), in which the valve is to be fitted. Adjacent the inner ends 21 of each end section 11 and 12, I provide a pair of spaced peripheral grooves 22 and 23, respectively, the inner one of which receives a sealing gasket or O-ring 24. Each end of the outer casing 10 is provided with a peripheral groove 25 and extending into these grooves are lock or set screws 26 and 27, respectively. The grooves 23 are adapted to be brought into alignment with the grooves 25 and thus it can be seen that the end sections 11 and 12 are free to rotate in respect to the center section 10 but may be firmly locked in place by means of the set screws 26 and 27 extending through the respective grooves 23 and 25.

The poppet valve 28 is associated with one end section 11 and is positioned in the casing 10 adjacent the conically shaped dished wall 18 of the partition 17. As previously mentioned, the end sections 11 and 12 are identically shaped but one end section 11 is provided with a pair of longitudinal grooves 30 spaced from and parallel to one another as shown more particularly in Figures 1 and 3 of the drawings. The purpose of these grooves will become readily apparent as the description proceeds.

Valve 28 is provided with a valve stem 31 extending laterally from the rear surface 32 thereof and this stem includes a pair of parallel members 32', the outer peripheries 33 of which form a continuation of the same circle to fit the smooth bore portion of the end section 11. Extending transversely across the valve and received in the stem members 31 is a pin 34. This pin terminates beyond the upper and lower arcuate surfaces 33 of the stem members 31 and fits into the grooves 30 formed of the end section 11 as clearly illustrated by Figures 1 and 3 of the drawings. Thus it can be seen that the valve 28 will rotate with the end section 11 but is free to slide longitudinally in respect thereto.

In order for the valve 28 to seat properly and close the port or aperture 13, I provide a spring 35 and this spring is received between the end 36 of section 11 and the shoulders 37 of the valve 28 to continuously urge the valve to its closed seated position. Obviously, the surface 37' of the valve 28 is conically shaped to correspond with the conical surface 18 of the intermediate partition. The outer periphery 38 of the valve is slotted or cut away on a continuous curve to provide a cam shaped slot 39 and this slot can be brought into alignment with the port 14 and turned in relation thereto, thus providing a fine control for the flow of fluid therethrough. This adjustment is obviously had by rotating the section 11 in relation to the center section 10. In utilizing my novel device, the amount of fluid to flow through the opening 14 is determined according to the particular job required and the valve 28 rotated to give this fine adjustment. Thus it can be seen that my novel control valve gives a free-flow in one direction as shown by the arrow, Figure 1 of the drawings, which flow opens the poppet valve 28 against the tension of the spring 35 and then gives a controlled flow in the opposite direction through the aperture or port 14, the amount of which is controlled by the position of the cam slot 39.

Particular attention should be given to the fact that the edges 40 of the arcuate graduated control surface 39 and edges of the port 14 are sharp and clear to prevent clogging. Also movement of this edge 40 past the inner sharp edge 41 will cut or clean any deposit that may have collected thereon.

The metered opening of the port 14, as illustrated in Figures 1, 2 and 4 of the drawings is shown at nearly the full flow and, obviously, the valve 28 can be turned in one direction (arrows Fig. 2) to continually restrict the port 14 and to finally entirely close off the port, if desired, thus making the valve a one-way free-flow valve.

Attention is now directed to Figures 5 and 6 of the drawings in which I have illustrated a modified form of my invention and in this form, the end sections 11' and 12' are substantially identical to the end sections 11 and 12 illustrated in Figure 1 and are provided with the O-ring 24', peripheral grooves and lock screws for the same purpose as shown and described in Figure 1 of the drawings. However, in this form of the invention, the intermediate partition 29 of center section 10' is formed differently in that the opening 42 formed therein is spiral shaped to give the cam like graduation 39'. Therefore, I provide a valve section 43 which includes an elongated stem portion 44, one end 45 of which is threaded and received in the section 11'. The other end 46 is provided with a central axial port 13' and the offset port 14'. The stem is also provided with a series of openings 47 so that fluid flowing through the aperture 14' may enter the central chamber 48 of the stem 41. This valve section 43 rotates with the section 11'. Within the stem of the valve section 43 is received a ball type poppet valve 49 which is urged to its seat by means of a spring 50. This spring 50 is, in turn, positioned on one side of the valve 49 and the other end thereof abuts against a spring washer or ring 51 received in a peripheral groove 52 of the stem. In order to seat the end 53 against the wall 54 of the intermediate partition 29, I provide a large spring 55 which exerts pressure against the inner end 56 of the section 11' and the wall 57 of the intermediate partition.

In assembling this form of my invention, the valve section 43 is positioned in the casing 10' through the end 58 (which later receives the end section 12') and end 44 is then threaded into the section 11'. Section 12' is positioned and locked in place as shown and section 11' may be adjusted to position the aperture 14' in a proper relation with the spiral surface 59 of the arcuate graduated control surface thereby giving the controlled flow of fluid. End section 11' is now locked in place to provide an inline control valve having a free-flow in the direction of the arrow and the controlled flow in the opposite direction.

From the foregoing it can be seen that I have provided a very compact inline control valve giving a free-flow in one direction and a fine adjusted control in the opposite direction and, further, inasmuch as the fine adjustment is had by the sharp leading edges 40, 41 and 60 in the respective forms of my invention, there is no tendency to clog as in other types of valves and the adjustment therefore, is extremely accurate and dependable as it must be in the new uses to which present inline valves are being adapted.

It should be further understood that minor changes in details may be resorted to without departing from the spirit of the invention or the scope of the appended claims.

I claim:

1. An inline control valve adapted to be placed in a fluid line comprising, an elongated casing having enlarged chambers opening out on each end thereof, an intermediate partition in said casing between said chambers and having means providing axial communication and an offset communication between said chambers, a pair of longitudinally aligned end sections each secured to a respective end of said casing and having a longitudinal bore communicating with a respective chamber, and valve means associated with one of said end sections cooperating with said intermediate partition including, a spring pressed valve for said axial communication providing a free flow in one direction and an arcuate graduated control surface on said valve cooperating with said offset communication to provide the controlled flow in the opposite direction.

2. An inline control valve adapted to be placed in a fluid line comprising, an elongated casing having enlarged chambers opening out on each end thereof, an intermediate partition in said casing between said chambers and having means providing communication between said chambers, a pair of longitudinally aligned end sections each secured to a respective end of said casing and having a longitudinal bore communicating with a respective chamber, and valve means associated with one of said end sections including an intermediate partition having a central axial port and an offset port communicating with said chambers, a poppet valve for said axial port providing a free flow therethrough in one direction and an arcuate graduated control surface adapted to be moved in association with said offset port to adjust the flow in the opposite direction.

References Cited in the file of this patent

UNITED STATES PATENTS

| | | |
|---|---|---|
| 2,148,839 | Rossman | Feb. 28, 1939 |
| 2,601,968 | Danielson | July 1, 1952 |
| 2,626,810 | Galera | Jan. 27, 1953 |
| 2,845,089 | Nickols | July 29, 1958 |